(12) United States Patent
Raciborski et al.

(10) Patent No.: US 8,417,824 B2
(45) Date of Patent: *Apr. 9, 2013

(54) DOMAIN NAME SERVICE RESOLVER

(75) Inventors: Nathan F. Raciborski, Phoenix, AZ (US); Michael M. Gordon, Paradise Valley, AZ (US); Nils H. McCarthy, Scottsdale, AZ (US); Brad B. Harvell, Chandler, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,889

(22) Filed: Aug. 7, 2012

(65) Prior Publication Data
US 2012/0303735 A1    Nov. 29, 2012

Related U.S. Application Data

(63) Continuation of application No. 13/347,387, filed on Jan. 10, 2012, now Pat. No. 8,250,219, which is a continuation of application No. 13/209,182, filed on Aug. 12, 2011, now Pat. No. 8,117,319, which is a continuation of application No. 12/645,041, filed on Dec. 22, 2009, now Pat. No. 8,024,468, which is a continuation of application No. 11/539,106, filed on Oct. 5, 2006, now Pat. No. 7,730,187.

(51) Int. Cl.
*G06F 15/16* (2006.01)

(52) U.S. Cl. ........ 709/227; 709/217; 709/218; 709/219; 709/220; 709/223; 709/224; 709/226; 709/228

(58) Field of Classification Search .................. 709/217, 709/218, 219, 220, 23, 224, 226, 223, 227, 709/228
See application file for complete search history.

(56) References Cited

U.S. PATENT DOCUMENTS

| | | | | |
|---|---|---|---|---|
| 6,961,783 | B1* | 11/2005 | Cook et al. | 709/245 |
| 7,086,061 | B1* | 8/2006 | Joshi et al. | 718/105 |
| 7,454,500 | B1* | 11/2008 | Hsu et al. | 709/226 |
| 7,496,190 | B1* | 2/2009 | Kung et al. | 379/211.02 |
| 2004/0073707 | A1* | 4/2004 | Dillon | 709/245 |
| 2004/0078334 | A1* | 4/2004 | Malcolm et al. | 705/50 |
| 2010/0223621 | A1* | 9/2010 | Joshi et al. | 718/105 |

(Continued)

OTHER PUBLICATIONS

Author Unknown, "Round-robin DNS," Wikipedia, Aug. 20, 2006, 1 page. Retrieved from: http://en.wikipedia.org/w/index.php?title=Round-robin_DNS&oldid=70733200.
Elz, et al., "Selection and Operation of Secondary DNS Servers," Request for Comments: 2182, Sanface, Jul. 1997, 12 pages.
Supplementary European Search Report of EP07843690 mailed on Dec. 18, 2012, 7 pages.

* cited by examiner

*Primary Examiner* — Liangche A Wang
(74) *Attorney, Agent, or Firm* — Kilpatrick, Townsend & Stockton, LLP

(57) ABSTRACT

A domain name service (DNS) resolver returns Internet protocol (IP) addresses. A connection with an Internet application or device receives domain name resolution requests that originate outside of the Internet. A direct DNS resolver identifies IP addresses without referring to the Internet or using other DNS resolvers. An address store includes a predetermined list of domain names and corresponding IP addresses specified from a point remote to the DNS resolver. The DNS resolver processes the domain name resolutions for the predetermined list of domain names differently than domain name resolutions for other domain names not on the predetermined list of domain names. At least part of the predetermined list is pushed to a destination upon receiving a resolution request for a domain name in the predetermined list of domain names, the request being of a type other than an authoritative resolution request to be performed by the direct DNS resolver.

20 Claims, 11 Drawing Sheets

DOMAIN NAME SERVICE RESOLVER

CROSS-REFERENCES TO RELATED APPLICATIONS

This application is a continuation of U.S. application Ser. No. 13/347,387 filed on Jan. 10, 2012, which is a continuation of U.S. application Ser. No. 13/209,182 filed on Aug. 12, 2011, which is a continuation of U.S. application Ser. No. 12/645,041 filed on Dec. 22, 2009, which is a continuation of U.S. application Ser. No. 11/539,106 filed on Oct. 5, 2006. Each of these references is hereby incorporated by reference in its entirety for all purposes.

BACKGROUND

This disclosure relates in general to networks and, but not by way of limitation, to packet switched networks using a domain name service.

Locating the Internet user within a network can be helpful for many reasons. Ad serving services sometimes use location information to choose location-specific ads. Content providers and content delivery networks (CDNs) sometimes use location information in routing of content to the Internet user in an efficient manner.

There are algorithms to determine a location of an Internet user based upon the location of the client local domain name service (DNS)server, sometimes also called a DNS proxy server, that the user's device utilizes to resolve domain names into IP addresses. Alternatively, routing protocols can route DNS resolution requests from the client local DNS server to a close authoritative name server for a particular domain name and a specific server IP address can then be assigned on the basis of that routing result. A presumption is made in these and similar processes, namely, that the location of the user's client local DNS server is in close network proximity to the Internet location of the user. Unfortunately, some report that 5-10% of Internet users are not located in close network proximity to their DNS server.

Internet users get Internet service through an access network or Internet service provider (ISP). The device of the user requests content objects from the Internet by using a host name and/or a domain name, along with a path and file name. Taken together, this is commonly referred to as a universal resource locator (URL). A domain name service (DNS) is used to convert the host name and/or the domain name into one or more Internet protocol (IP) addresses through a process called domain name resolution. Once the device receives the name resolution, containing server IP address(es), the content object is requested from a server as indicated by the IP address(es).

The access network typically provides a client local DNS server that allows resolving the domain name in a recursive process. The client local DNS server acts as a proxy to the Internet user's device and gathers the correct IP address(es) from other DNS servers before returning the address(es) to the Internet user. In some cases, the client local name DNS server may return a cached IP address that was previously found in a recursive manner. These and other DNS servers together form the Internet DNS system that allows resolving every valid domain and/or host into an IP address. The client local name DNS server normally includes function that enables it to track and adhere to a time-to-live for each returned IP address. The time-to-live is normally, but not always, specified by the authoritative DNS server for the domain name. After expiration of the time-to-live, the cached IP address(es) should no longer be used.

There are public DNS servers on the Internet away from the user's access network that cooperate as a DNS system. These public DNS servers provide recursive IP address look-up in much the same way as a client local DNS server within the access network. Unless access is blocked by an enterprise network or access network, Internet users can effectively use public DNS servers. For networks that block DNS requests destined for more than a few approved IP addresses, users must use the approved IP addresses for their DNS requests. Typically, the approved IP addresses are those within the access or enterprise network or those specifically approved by the access or enterprise network.

There are authoritative DNS servers on the Internet that are the final provider of IP addresses for a given Internet domain name. Through the recursive process, a DNS server, such as a client local DNS server, ultimately ends up communicating with an authoritative DNS server to accurately resolve the host name and/or domain name into IP address(es). Authoritative DNS servers for domains can be maintained by content originators, a CDN servicing the content originator, an ISP, a DNS services provider, or another organization.

A user device may automatically communicate with client local DNS servers provided by the ISP, access network, or enterprise network utilizing a protocol such as the Distributed Host Command Protocol (DHCP) or similar protocols. Through one or more successive DHCP transactions, client local DNS server IP addresses provided by the access server are communicated to a DNS resolver subsystem of the user device. Often, there are primary and secondary client local DNS server IP addresses provided, so that if the primary client local DNS server is not available (failed, powered off, not reachable via the network, etc.), the secondary client local name server can be used in the alternative. The DHCP or similar process is often performed by the computer operating system or firmware in an Internet connected device.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1:
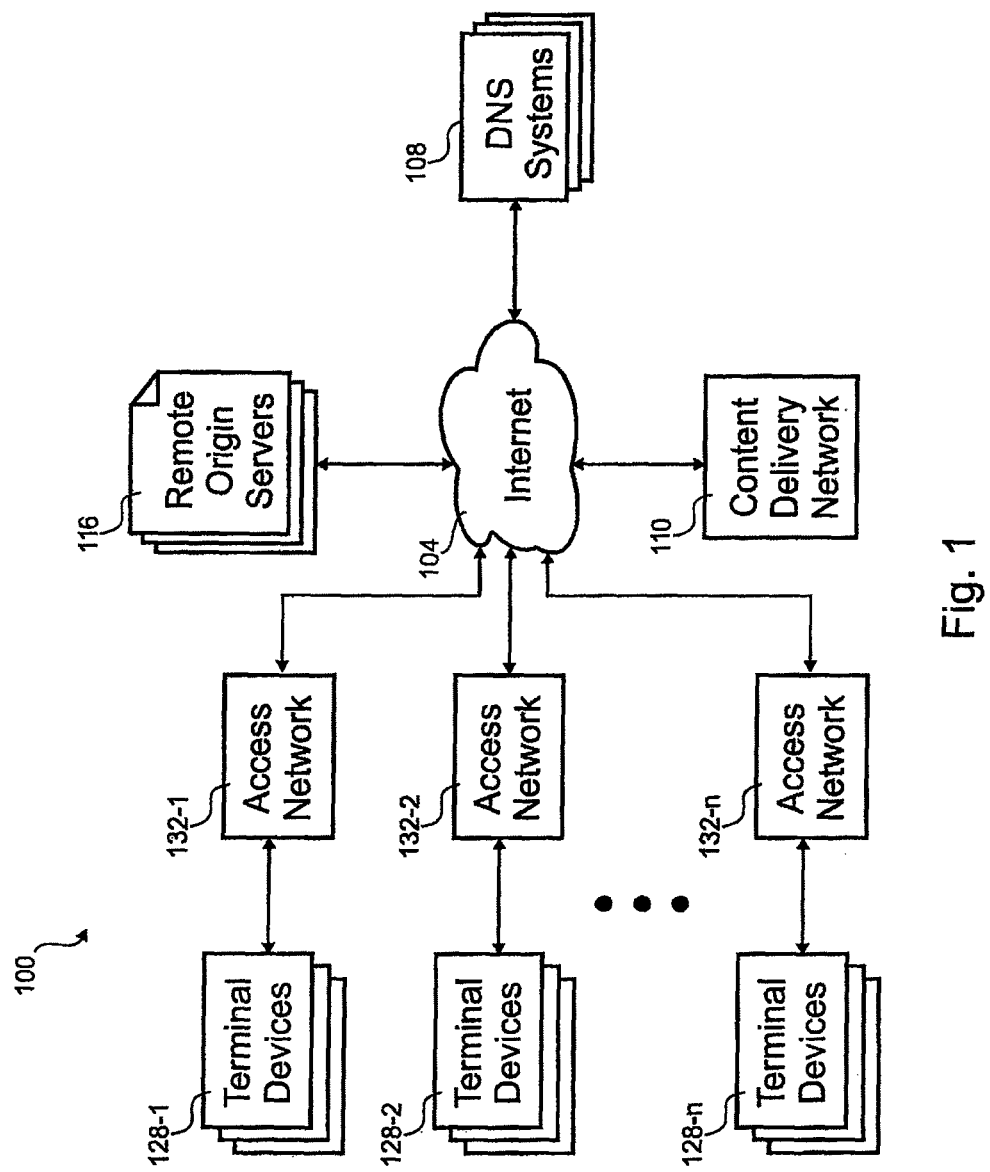
FIG. 1 depicts a block diagram of an embodiment of a content delivery system.

Referring first to FIG. 1, a block diagram of an embodiment of a content delivery system 100 is depicted. Terminal devices 128 are delivered content objects from remote origin servers 116 and one or more content delivery networks (CDN) 110. The CDN 110 is made up of a plurality of points of presence (POPs) distributed geographically around the Internet 104. The content objects could be content files or streams of content. A terminal device could be a computer, a PDA, a television set top box, a content player, an IP TV player, an Internet appliance, or any other device receiving content objects from a packet switched network, for example, the Internet 104.

The terminal devices 128 resolve IP addresses by providing a domain name to a domain name service (DNS) in a process called DNS resolution. The terminal device 128, an access network, the CDN 110 may each contain a DNS. A DNS resolves domains in one of two ways. A given DNS may act authoritatively to provide an IP address for a given domain that is controlled by the DNS. In this authoritative mode, the DNS does not refer to other DNS, but looks up the IP address from its own database. Where the domain is not controlled by the DNS, the domain is resolved in a recursing mode that refers to other DNS systems 108.

In recursing mode, DNS resolution begins at a top level domain DNS system 108, such as ".com" or ".net." The top level DNS server provides the IP addresses of authoritative name servers for the specified domain to requesting DNS systems 108. These IP addresses are commonly specified in "NS" records provided by the domain owner or controller. Through other standard DNS services, such as CNAME and other services, DNS requests can be delegated successively to other DNS name servers until the request arrives at a DNS name server that is actually authoritative for the domain name. One or more IP addresses are then provided to the client local DNS server by the authoritative DNS server and may include a time-to-live. After the time-to-live expires, the cached IP address(es) should be discarded by the client local DNS server such that the recursive mode can be used again to find the authoritative DNS that supplies the IP addresses again, either the at the same IP addresses or new IP addresses.

Each terminal device 128 is connected to the Internet 104 through an access network 132. There are many access networks and many terminal devices divided among the access networks 132. An access network 132 is commonly called an Internet service provider (ISP) and provides a conduit to remote origin servers 116 and content delivery networks 110 who provide and/or accept content objects. Remote origin servers 116 could include web sites, content download, streaming services, and/or any other content that uses the Internet DNS system. A CDN 110 generally serves as an offload mechanism for origin servers to offload content delivery. To provide adequate quality of service QoS, the location of the terminal device 128 is often desired by remote origin servers 116 and CDNs 110, either directly or indirectly, such that terminal devices can be directed with some level of network location information or relevance to one or more IP addresses from which the content object is available. Some embodiments do not rely upon the location of the terminal device 128 and use IP anycast or similar techniques to find close by resources.

Figure 2A:
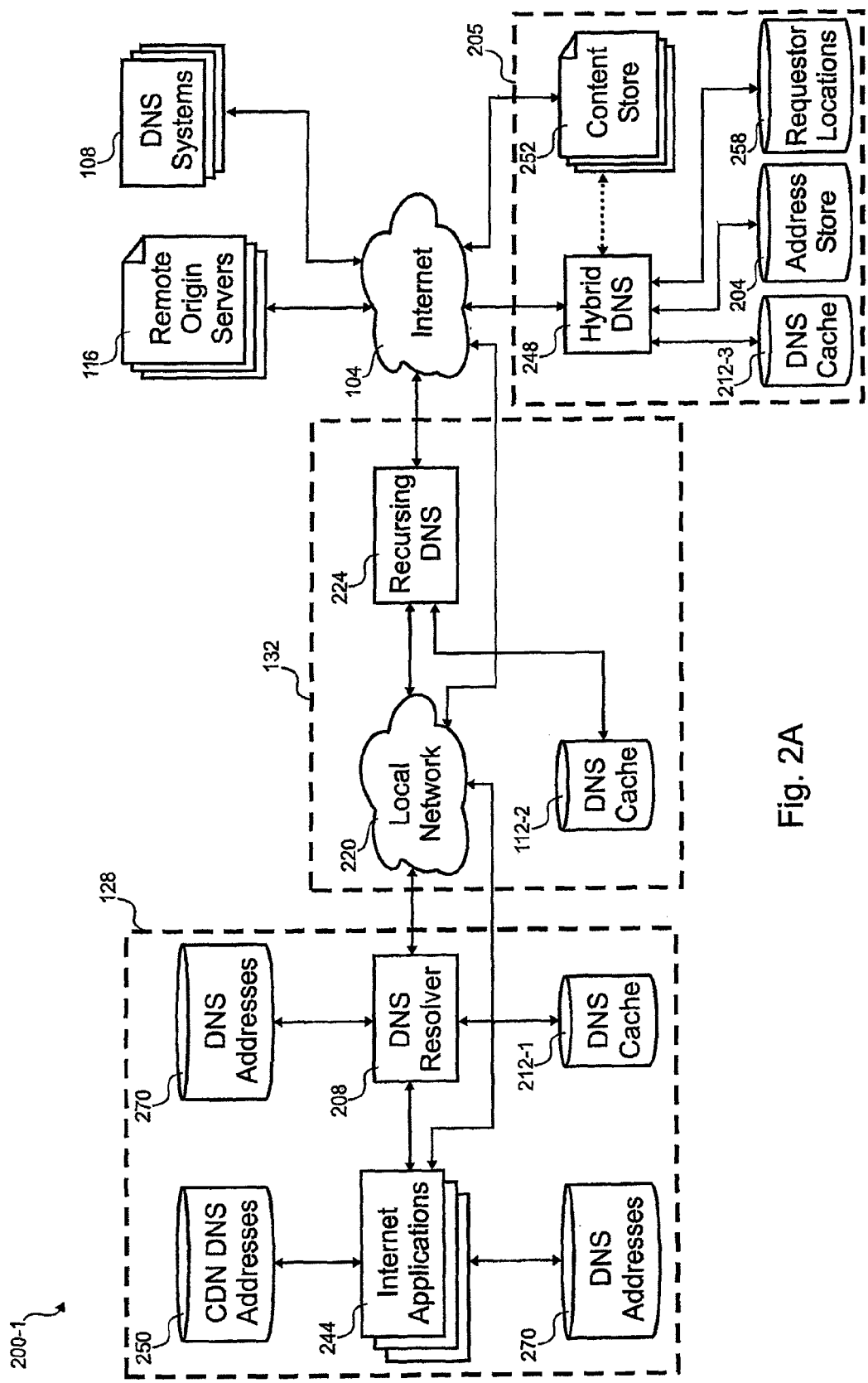
FIGS. 2A, 2B, 2C, and 2D depict block diagrams of embodiments of a content delivery network.

With reference to FIG. 2A, a block diagram of an embodiment of a content network 200-1 is shown. This content network 200 shows more detail for one terminal device 128 and one access network 132, but it is understood that the content network 200 would be part of a larger content delivery system 100 with many terminal devices 128 and access networks 132. Although this embodiment shows certain blocks being grouped together, the blocks could be rearranged or geographically distant, but connected by one or more networks.

The terminal device 128 includes Internet applications 244, a DNS resolver 208 and a DNS cache 212-1. Terminal devices 128 come in various configurations, but a function they generally have in common is that they request and receive content objects using the Internet 104. The requested content object is realized, played, stored, processed, etc. with the terminal device 128 or some device coupled to the terminal device 128. Multiple Internet applications 244 may be run on the terminal device 128 that each use content objects. In some embodiments, the Internet applications 244 are not run in software but performed in hardware.

In this embodiment, the Internet applications 244 can optionally use the DNS resolver 208 to perform DNS lookups or resolutions in the conventional manner. The DNS resolver 208 can utilize the client local DNS server 224 as a DNS proxy. The DNS resolver 208 has access to the IP address of the client local DNS server 224, which can be entered manually by the user or obtained through an automated process such as DHCP. The results from past DNS resolutions may be stored, subject to time-to-live parameters, by the DNS resolver 208 in the DNS cache 212-1 to allow faster resolution of repeated requests. The results in the DNS cache 212-1 have a time-to-live specified to avoid stale DNS resolutions from being used from the DNS cache 212-1. The DNS resolver 208 may use client local DNS server 224 in the access network 132 to provide a final DNS resolution and/or point to a hybrid DNS server 248 in a CDN POP 205 for resolution. The DNS resolver 208 could be part of the operating system for the terminal device 128 or an optional add-on.

In this embodiment, the Internet applications 244 can contact the DNS resolver 208 for conventional DNS resolutions and/or the hybrid DNS 248 directly to request a DNS lookup independently from the DNS resolver 208. The IP address(es) of the client local DNS server 224 and possibly some alternative DNS proxy servers are communicated to the Internet applications 244 and/or the DNS resolver 208 through a process such as Dynamic Host Configuration Protocol (DHCP). IP addresses for client local DNS server(s) 224 can also be entered manually, but in any event the addresses are stored by the Internet application(s) 244 and/or the DNS resolver(s) 208 in the DNS address store 270.

At the factory, in a setup process, or via updates to the device's software or firmware, the IP address(es) for the hybrid DNS server 248 can be communicated to the Internet applications 244 or the DNS resolver(s) 208 and stored in a direct DNS address store 250. The Internet applications 244 can periodically update the direct DNS address store 250 to track any changes to the location of hybrid DNS server 248. There are often multiple IP addresses for the client local DNS server 224 and the hybrid DNS server 248, which may each correspond to one or more servers. Each IP address for the client local DNS server 224 or the hybrid DNS server 248, respectively, is equally capable of resolving DNS requests in this embodiment. Updates can come from the hybrid DNS servers 248 or a central location (not shown).

The terminal device 128 uses a local network 220 of the access network 132 to resolve domain names and send/receive content objects. A cable modem, DSL modem, satellite modem, WiMax connection, WiFi connection, laser modem, or any other networking device could be used to couple the terminal device to the local network 220 in a wired or wireless manner.

The client local DNS server 224 of the access network 132 can resolve domain names on behalf of the various terminal devices 128. In some cases, the resulting IP addresses from prior requests for a domain name resolution are stored in a DNS cache 112-2. After a time-to-live specified by an authoritative DNS providing the IP address expires, the information is removed from, or ignored by, the DNS cache 112-2. Through a multi-step process, the client local DNS server 224 consults with a one or more DNS systems 108 until it reaches an authoritative DNS server for a particular domain. That authoritative DNS server provides one or more IP addresses that can be stored in the DNS cache 112-2 and returned to the requesting terminal device 128 when a look-up is requested.

In some embodiments, the terminal equipment 128 and/or access network 132 can attempt to block DNS lookups that attempt to avoid the DNS resolver 208 and/or client local DNS server 224. DNS lookups from the Internet applications 244 could be blocked under these circumstances. Some embodiments encrypt or scramble the DNS requests and/or use non-standard Internet ports.

The CDN 110 is typically the first choice of some terminal devices 128 in resolving a domain name in this embodiment. By going to the CDN 110 first, the CDN 110 can directly or indirectly determine, or in some cases sense, the approximate location of the terminal device 128 within the Internet more accurately. The terminal device 128 stores direct DNS addresses 250 to allow access directly to the hybrid DNS 248. The hybrid DNS 248 can operate in both a recursing mode or an authoritative mode in this embodiment. For domains having content objects that are delivered by the CDN 110, the CDN 110 through its various POPs 205 serves as an authoritative DNS to the terminal devices 128. A content directory 205 holds the database of controlled domains and may hold the IP addresses associated with each controlled domain.

The hybrid DNS 248 is accessible directly from the Internet applications 244 or can be found through the conventional DNS resolution process. The hybrid DNS server 248 acts as the authoritative DNS for information in the content stores 252. The Internet application 244 can use the direct DNS addresses 250 for a direct connection or can use the standard client local DNS server 224 addresses for a conventionally executed DNS lookup. For example, if the Internet application 244 cannot reach the hybrid DNS server 248 because the direct DNS addresses 250 are blocked or filtered by the access or enterprise network, then the Internet application 244 could use the client local DNS server 224 address(es) and execute a conventional DNS lookup.

There may be a number of alternative IP addresses available for the hybrid DNS 248 with some sort of scheme to find the closest. Other embodiments could use IP anycast or similar Internet routing protocols to advertise a single IP address that is applicable to a number of hybrid DNS servers 248. By using IP anycast, the Internet applications 244 can find their way to the closest hybrid DNS server 248 that uses the shared IP address. The hybrid DNS server 248 can then provide content server IP addresses in the DNS solution that are close to the hybrid DNS server 248 and therefore by implication close to the terminal device 128. In other words, a DNS lookup that is routed to a particular hybrid DNS server 248 because of the implementation of IP anycast will often be reasonably served by a content store 252 close to the hybrid DNS server 248.

Where a domain is not served by the CDN POP 205, the hybrid DNS server 248 switches to recursing mode in this embodiment. In this mode, a DNS cache 212-3 may store a result from a prior DNS request. Where there is no stored result, the hybrid DNS 248 recursively refers to other DNS systems 108 to find the authoritative DNS server to provide the current IP address(es) for a domain. The result, along with a time-to-live, is stored in the DNS cache 212-3. When acting in recursive mode, the hybrid DNS server 248 acts in a similar fashion as a client local DNS server 224 does, fulfilling that functional role for the Internet applications 244 who contact the hybrid DNS server directly.

The content stores 252 hold the content that the CDN 110 delivers for content providers from a particular POP 205. These content stores 252 are typically geographically distributed across the Internet 104 through a number of POPs 205 that are part of the CDN 110. Some embodiments are aware of actual or approximate terminal device 128 locations within the Internet and therefore do not n utilize IP anycast or similar routing protocols for identifying the closest hybrid DNS server 248. By knowing or determining the actual or approximate location of the terminal devices 128, the hybrid DNS server 248 can choose content stores 252 nearby the terminal device 128 in the present POP 205 or another POP 205. Routing the terminal device 128 by the hybrid DNS server 248 to IP addresses of content stores 252 that are closer to the terminal device 128 in response to the DNS request is likely to improve quality of service.

Figure 2B:
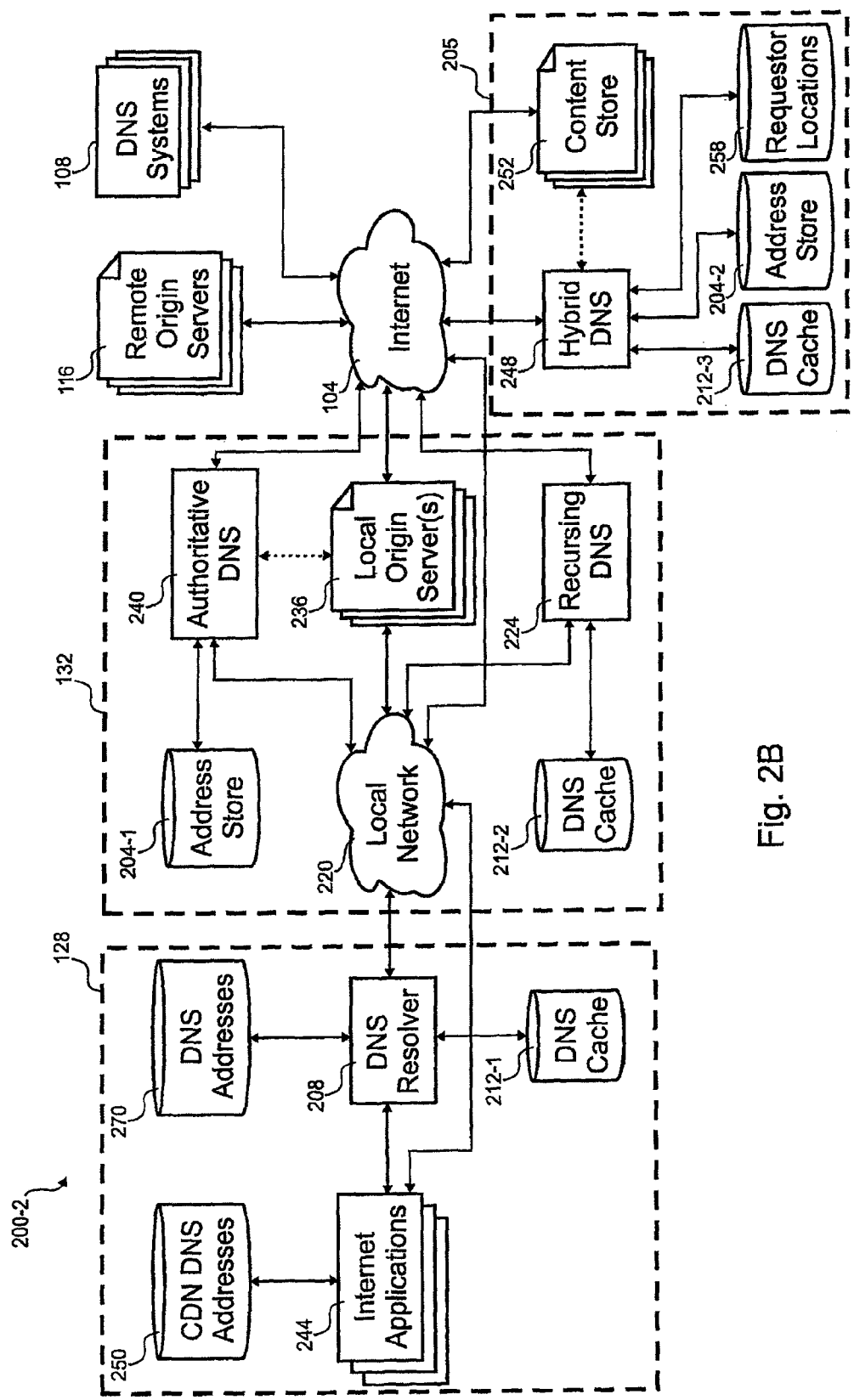

Referring next to FIG. 2B, a block diagram of another embodiment of the content network 200-2 is shown. This embodiment has several differences from the embodiment of FIG. 2A. The Internet applications 244 can directly connect with the hybrid DNS server 248 using the store of direct DNS addresses 250 in this embodiment, but do not perform conventional DNS resolutions. To perform convention DNS resolutions, the DNS resolver 208 is used. The DNS resolver 208 works in the conventional way by use of the DNS addresses 270 to perform DNS lookups. The access network 132 has some local origin servers 236 in this embodiment.

The access network 132 acts in both authoritative and recursing modes. Domains in the local origin servers are resolved in authoritative mode using an authoritative DNS 240 by referencing an address store 204 to find a directory of content. If a domain cannot be resolved by the authoritative DNS 240, resolution passes to the client local DNS server 224 for completion. A DNS cache 212-2 may be used to store results from prior requests. Although the authoritative DNS 240 and client local DNS server 224 are shown as separate blocks, they could be combined and referenced by the same IP address(es).

This embodiment is not aware of terminal device location 128 and no attempts are made to determine location. There are a number of CDN POPs 205 that each contain a hybrid DNS server 248 using the same IP address. Using IP anycast, the terminal device 128 finds the closest CDN POPs 205 who then specifies local content stores 252 to source the content. Presuming the CDN POPs 205 was a good choice, the local content stores 252 are likely to be a good choice also.

Figure 2C:
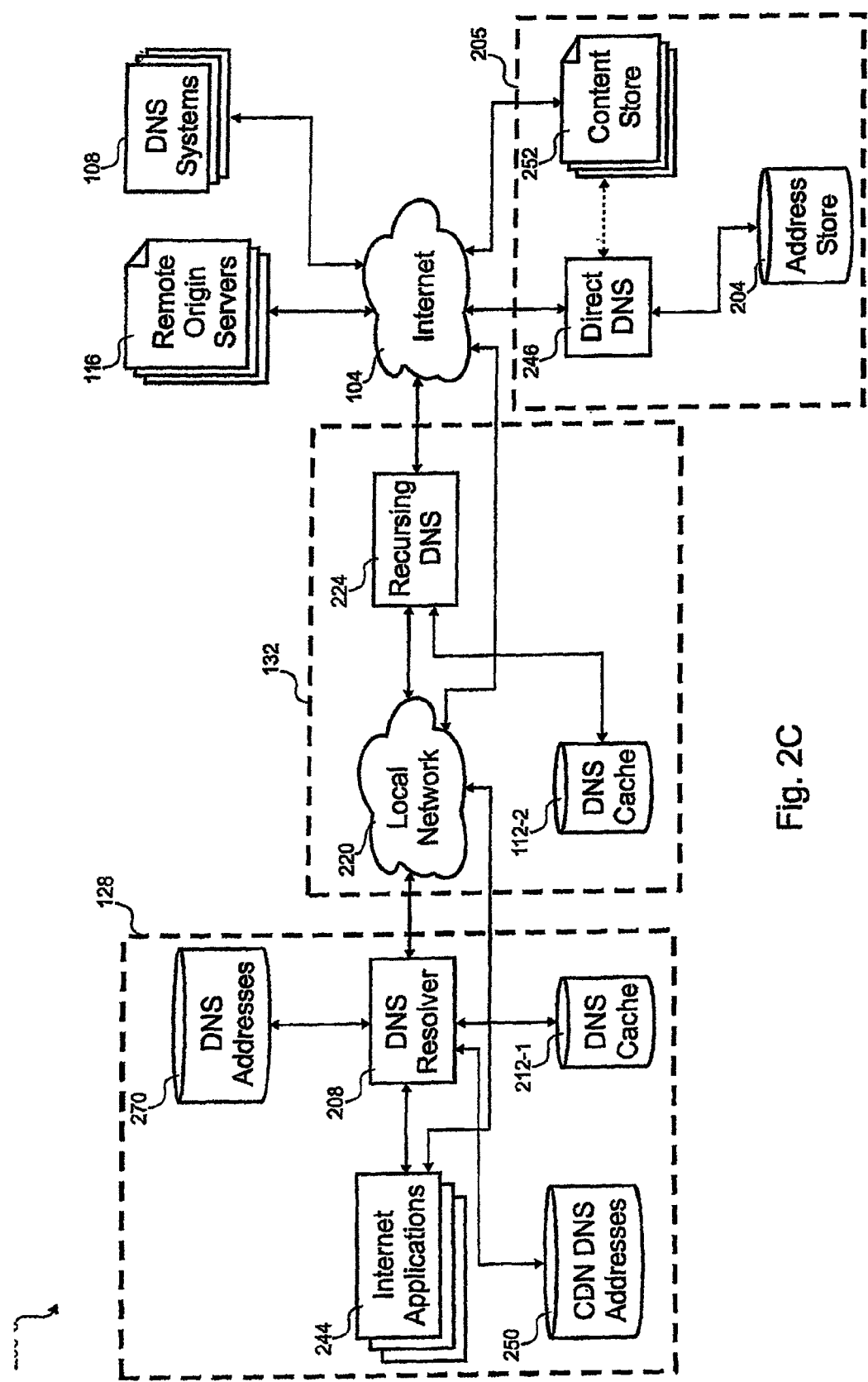

Referring next to FIG. 2C, a block diagram of yet another embodiment of the content network 200-3 is shown. This embodiment has a terminal device 128 with a DNS resolver 208 that can directly connect with a direct DNS server 246 in the POP 205 as well as connect with a client local DNS server 224 to perform conventional DNS look-ups. The Internet applications 244 rely on the DNS resolver 208 for DNS look-ups without any awareness of whether a direct connection is made or a conventional look-up is made. A direct connection allows using a direct DNS address 250 to go directly to the direct DNS server 246 without referring to another DNS such as the client local DNS server 224 or the DNS systems 108.

The direct DNS addresses 250 contains a table, or list, of IP addresses to use for various URL components such as domain names and/or host names. When any of the specified domains and/or hosts are requested by the Internet applications 244, the DNS resolver 208 knows the correct IP address to use for the direct DNS server 246 for that domain or host. When a particular domain and/or host is not on the direct DNS list 250, a conventional DNS look-up is performed. The direct DNS addresses 250 may be periodically updated via a message from the direct DNS server 246 to the DNS resolver 208, a message from another server to the DNS resolver 208, a query from the DNS resolver 208 to a server, a software or firmware update to the device, the device's operating system, the DNS resolver 208 software, and/or by another similar methods. The direct DNS address list 250 could include addresses for sites other than CDNs 110 and could have IP addresses for Direct DNS servers 246 that are authoritative name servers for any Internet site that could benefit from bypassing a portion of the conventional DNS lookup process and executing DNS lookups directly at the direct DNS server that is authoritative for the domain.

The various terminal devices 128 could have their direct DNS address lists 250 updated upon request, according to a predetermined schedule and/or whenever a host name cannot be found for a domain in the Direct DNS address list 250. The sole table shows an example of some entries in the Direct DNS address list 250, where * denotes a wildcard field of zero or more characters. In this embodiment, the rules are run in order listed in the table until there is a match. For example, if http://www.acme.llnw.net were requested, the IP address 141.26.128.11 would be returned to point at one or more direct DNS servers 246.

TABLE

Direct DNS Address List

| Request | IP Address |
| --- | --- |
| *acme.llnw.net | 141.26.128.11 |
|  | 141.26.128.19 |
| *foo.llnw.net | 141.26.128.12 |
| *sepher.llnw.net | 141.26.128.13 |
|  | 141.26.128.21 |
| *.llnw.net | 141.26.128.45 |
| *acmellnw.net | 128.850.1.10 |
|  | 139.145.67.102 |
|  | 23.45.123.234 |
| *pics.msllnw.net | 148.234.532.10 |
| *tunes.msllnw.net | 148.234.532.10 |
| *msllnw.net | 148.234.532.30 |

Although this embodiment does not include any time-to-live, other embodiments could include a time-to-live for individual entries in the Table. When a time-to-live expires, the entry could be removed or an update request could be initiated to see if the entry has any new information or a new time-to-live. A time-to-live could be strictly enforced, meaning the entry would not be used under any circumstances after expiration, or a time-to-live could be loosely enforced, meaning the entry would continue to be used after expiration until an updated entry is available.

Some embodiments could automatically trigger an update of the direct DNS address list 250 when an unknown host is used with a known domain. For example, should zigbat.llnw.net be requested, the IP address would return 141.26.128.45 and the DNS resolver 208 would check for a more specific IP address, which if found could be used for subsequent requests. Should the direct DNS address list 250 be exhausted without a match, a conventional DNS look-up is initiated. Should the Direct DNS address for a specific host or domain be inoperative (that is, no response is received after a specified interval), a conventional DNS look-up is initiated to find the IP address. If a specified number of direct DNS address lookups fail in this manner, Direct DNS lookups can be automatically suspended for a specified period of time; during this period, conventional DNS lookups would be initiated.

In addition to polling by the Internet application 244 and/or DNS resolver 208, some embodiments could attempt to sense when a particular IP address is using an outdated direct DNS address list 250. Each direct DNS 248 can receive domain resolution requests through a conventional DNS process. A modified protocol for direct DNS requests can be discerned to allow distinguishing conventional DNS requests from those using the direct process. Where an Internet application or device should be using the direct request and makes a conventional request instead, the IP address could be noted. An updated direct DNS address list 250 could be pushed to that IP address to force an update.

The direct DNS 246 of the POP 205 does not determine requestor location and does not perform recursive DNS lookups in this embodiment. Only the addresses for the content store(s) 252 are provided from the direct DNS server 246 in this embodiment. There are a number of POPs (only one shown for simplicity) that are geographically distributed and use IP anycast or other similar routing techniques to allow a particular DNS look-up to fall to the closest (in network terms) direct DNS server 246. The responding direct DNS server 246 would then serve the content object from its local content stores 252. When finding the direct DNS server 246, interposition of a client local DNS server 224 or other DNS systems 108, and their IP address caches, can be avoided in this embodiment.

The direct DNS server 246 could use a standard DNS protocol or could modify that protocol. The modified protocol could provide a unique serial number or other unique identifier for the terminal device 128, other metadata, and/or location information. The direct DNS server 246 could re-route the DNS lookup based upon location information or could look-up a location from the unique serial number. This location-based routing could be done as a refinement of the IP anycast or as a substitute in various embodiments.

Figure 2D:
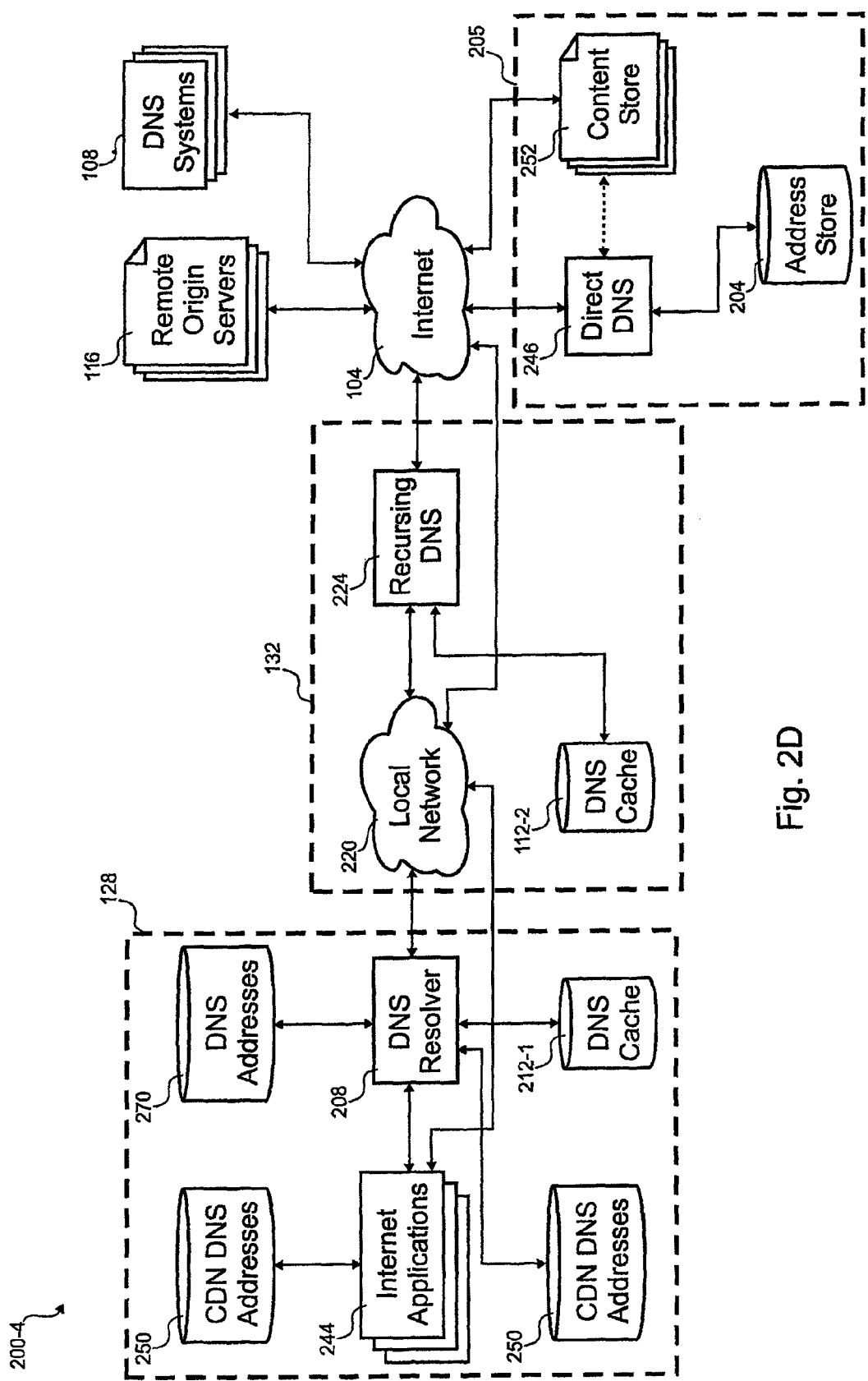

With reference to FIG. 2D, a block diagram of still another embodiment of the content network 200-4 is shown. This embodiment allows both the DNS resolver 208 and the Internet applications 244 to look-up direct DNS addresses without going through a full, conventional DNS lookup. There may be more than one direct DNS address list 250, so that the DNS resolver 208 and/or various Internet applications 244 can use different direct DNS address lists 250 that do not necessarily match. Other embodiments could use the same direct DNS address list 250. The Internet applications 244 could avoid the DNS resolver 208 during direct DNS operations, or the DNS resolver 208 could intercept those requests and provide the DNS resolution without the Internet application 244 knowing. The DNS resolver 208 resides in the terminal device 128 for this embodiment, but could be in a network appliance working with a group of terminal devices 128 at a point away from the terminal devices 128 or even in the access network 132 in various embodiments.

Figure 3A:
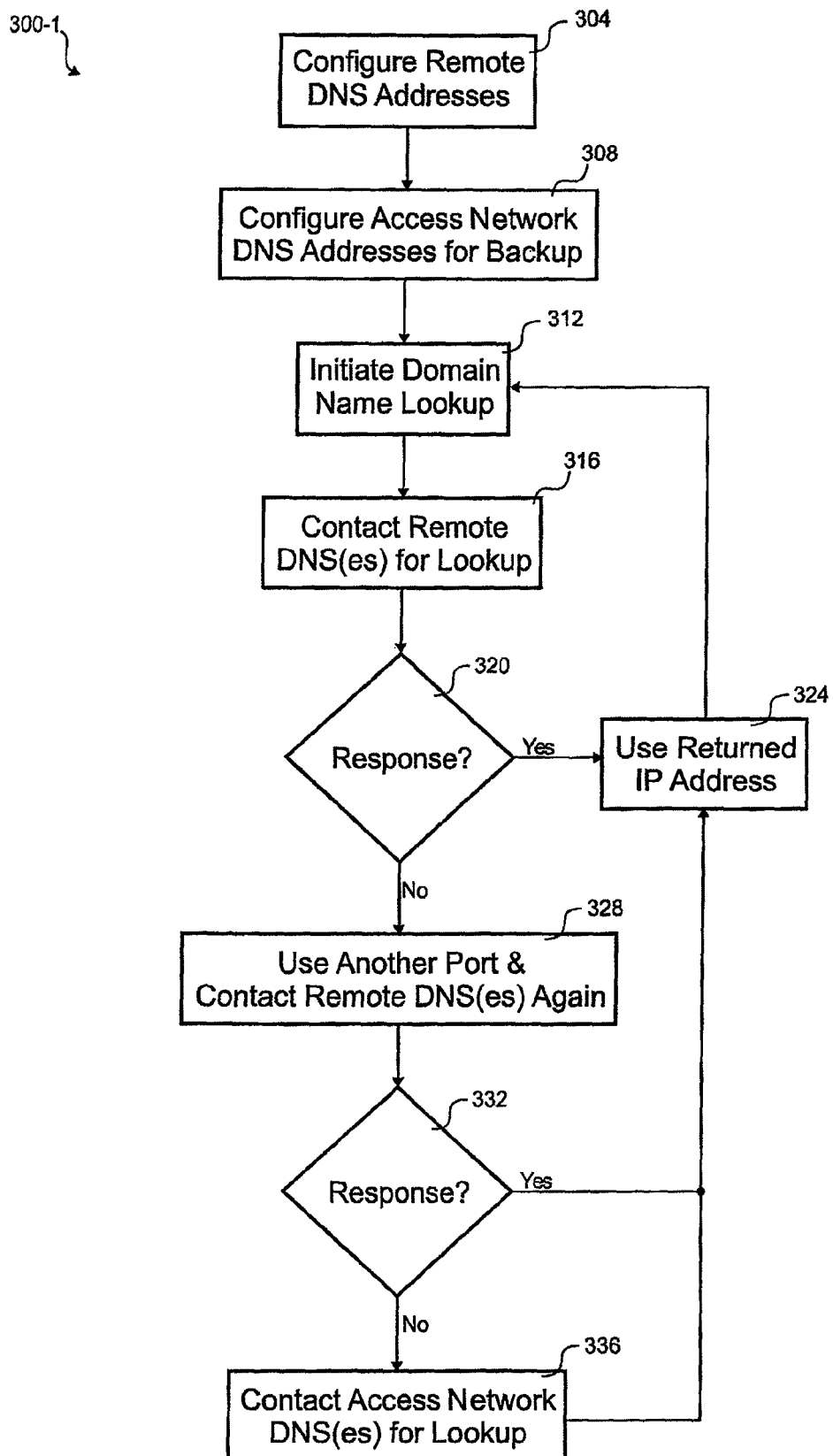
FIGS. 3A, 3B and 3C illustrate flow diagrams of embodiments of a process for resolving a domain name for a terminal device.

With reference to FIG. 3A, a flow diagram of an embodiment of a process 300-1 for resolving a domain name for a terminal device 128 is shown. The depicted portion of the process 300-1 begins in block 304 where the terminal device 128 is configured with the DNS addresses of the one or more hybrid or direct DNS server(s) 248, 246 as a seed. The initial seed DNS server addresses are generally not optimized for the location of the terminal device 128, but can be later updated to use hybrid DNS server(s) that are likely to be closer to the terminal device 128 in some embodiments. Some embodiments could instead rely on IP anycast or a similar protocol to refine the POP 205 used to fulfill a particular request. This embodiment uses any DNS server(s) 224, 240 in the access network 132 as a backup. The IP address(es) for those backup DNS server(s) 224, 240 are configured in block 308. This configuration of IP addresses in blocks 304 and 308 can be done automatically and/or manually.

In block 312, one of the Internet applications 244 initiates a domain name resolution request. The remote DNS server(s) (i.e., the one or more hybrid or direct DNS server(s) 248, 246) is contacted in block 316. When there is more than one hybrid or direct DNS server 248, 246, the DNS resolver 208 may sequentially query each hybrid or direct DNS 248, 246 or could query the hybrid or direct DNS server(s) 248, 246 in parallel. Those hybrid or direct DNS server(s) 248, 246 noted to generally respond first could be prioritized to try sooner when doing the next query. Alternatively, IP anycast or a similar protocol could be used to find the first hybrid or direct DNS server 248, 246 to use without concern for specific location processing. Where there is a response to the domain name resolution request as determined in block 320, the DNS resolver 208 returns the IP address(es) to the Internet application 244 for use in block 324. As described above, there may be caching of the results by the DNS resolver 208 for a specified time-to-live.

Where there is no response, the hybrid or direct DNS server(s) 248, 246 may be blocked or inoperable. In block 328, another port is tried for contacting the hybrid DNS server(s). The port may be randomly chosen or chosen from a predetermined port list. Blocking and filtering techniques often screen on port such that changing the port may get around the block or filter. Some embodiments may also encrypt the domain request to defeat those blocks that analyze contents of the requests. If a response is found in block 332, processing continues to block 324 where the IP address is used to request a content object, for example.

Where there is no response in block 332, the client local DNS server 224 and/or authoritative DNS server 240 of the access network 132 is consulted to resolve the domain. There could be multiple alternatives in the access network 132 that could be referenced serially or in parallel. If not cached, the access network DNS server(s) may refer to the hybrid or direct DNS servers 248, 246 to resolve the domain name for content objects 252 associated with the DNS 110 as the hybrid or direct DNS server 248, 246 is the authoritative DNS for those content objects 252. After retrieval from the access network DNS 224, 240, the IP address is used in block 324 before looping back to block 312 for the next domain lookup. Although the steps in this process should be performed sequentially, multiple domain name and/or host name look-ups following this process need not necessarily be performed sequentially, but instead may be performed in parallel with one another.

Figure 3B:
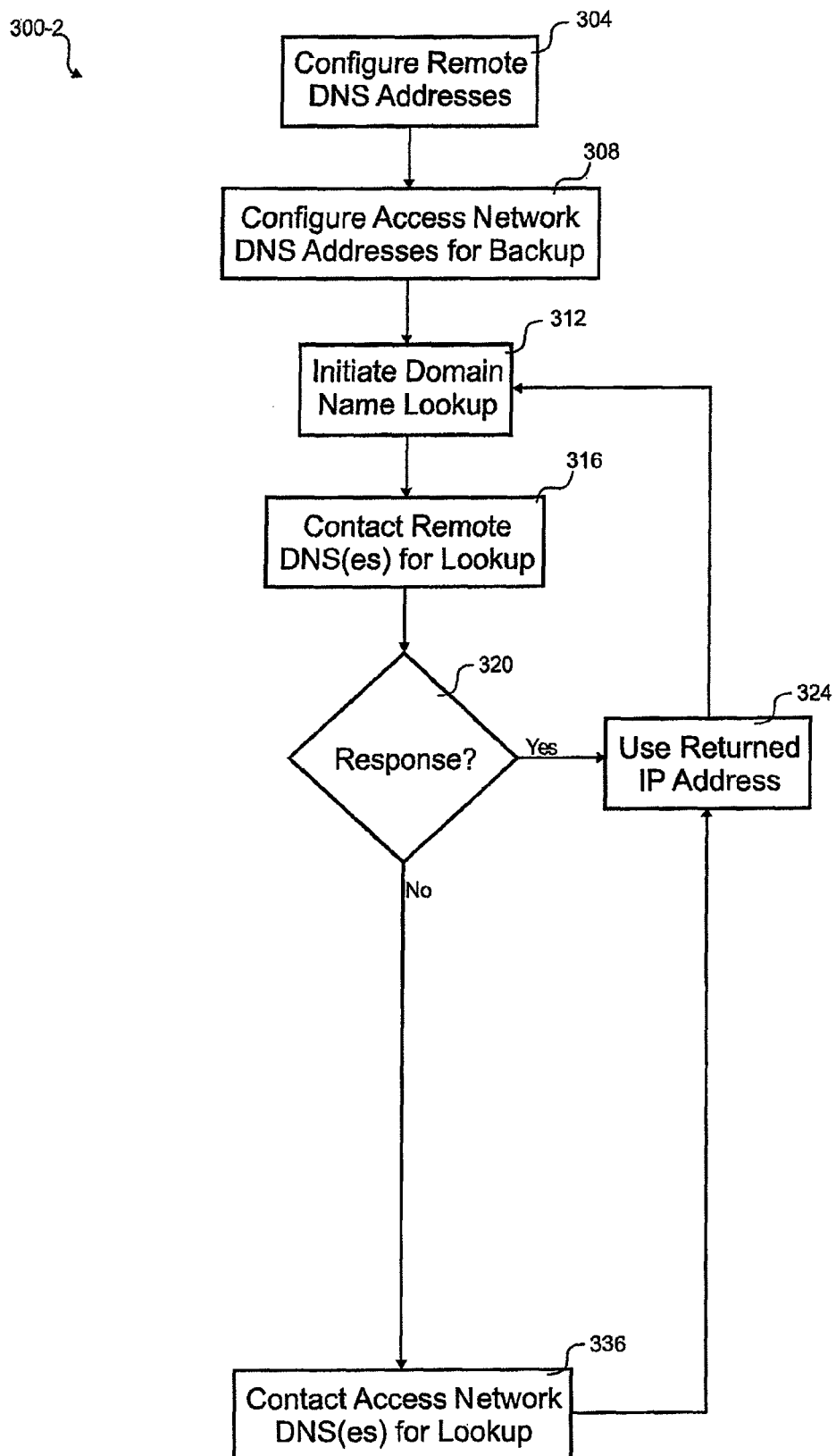

Referring next to FIG. 3B, a flow diagram of another embodiment of a process 300-2 for resolving a domain name for a terminal device is shown. This embodiment removes blocks 328 and 332 from FIG. 3A. Port changing to avoid blocking techniques is not performed in this embodiment.

Figure 3C:
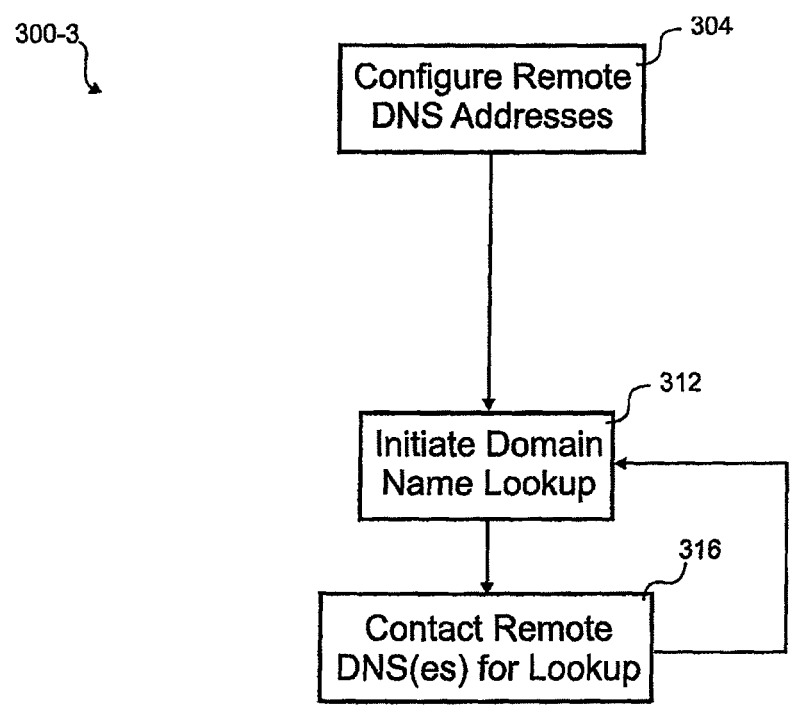

With reference to FIG. 3C, a flow diagram of yet another embodiment of a process 300-3 for resolving a domain name for a terminal device is shown. This embodiment performs only blocks 304, 312 and 316 before looping back to block 312. Only the hybrid or direct DNS server 248, 246 is used to resolve domain names in this embodiment. Where this solution doesn't work, the embodiments of FIG. 3A or 3B could be used.

Figure 4A:
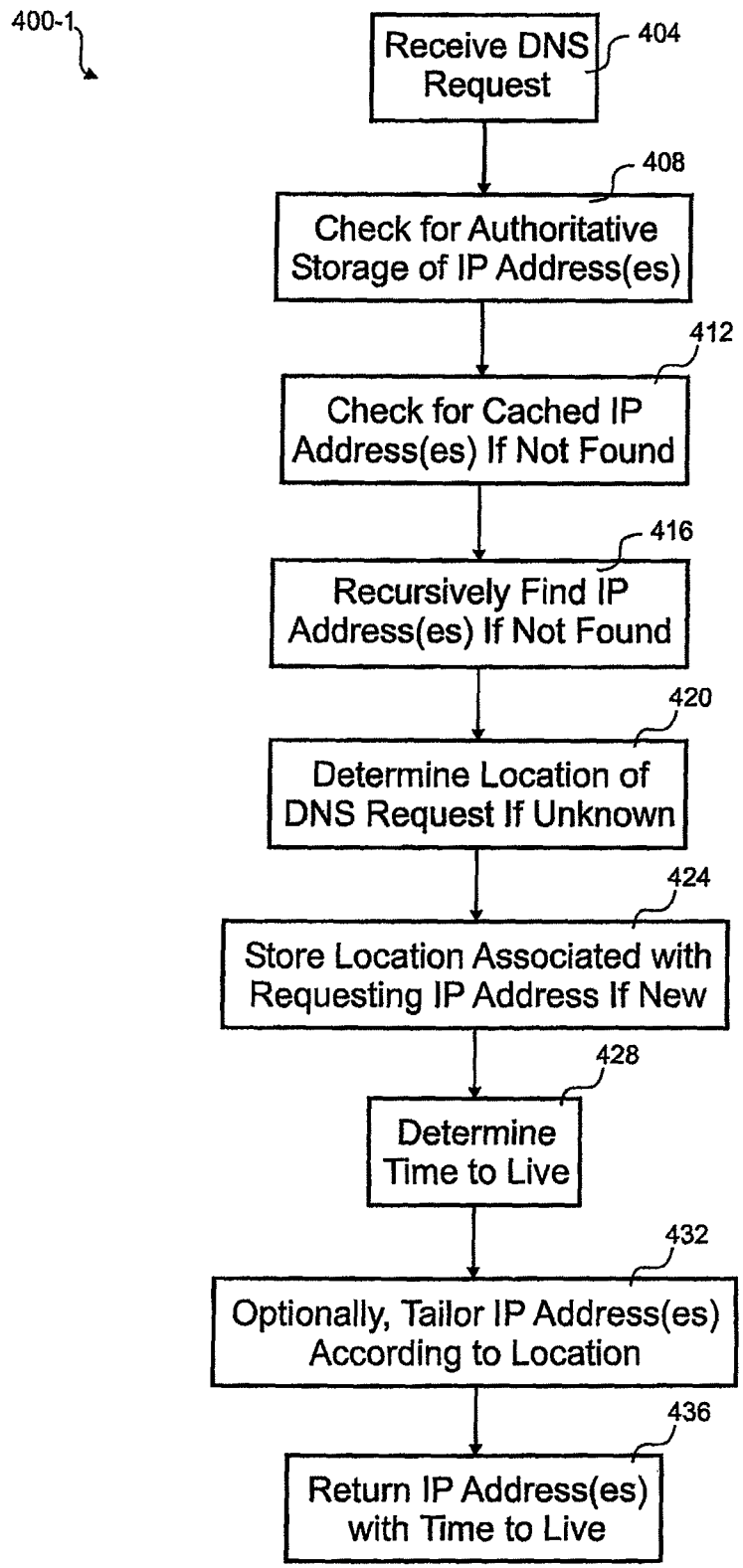
FIGS. 4A, 4B and 4C illustrate flow diagrams of embodiments of a process for returning an Internet protocol (IP) address for a provided domain name.

Referring next to FIG. 4A, a flow diagram of an embodiment of a process 400-1 for returning an Internet protocol (IP) address for a provided domain name. This process 400-1 is described from the perspective of the hybrid DNS server 248. The depicted portion of the process 400-1 begins in block 404 where a domain resolution request is received by the hybrid DNS server 248. In block 408, the content directory 205 is checked to determine if the requested domain name is available in authoritative mode. If not found, block 412 tries to find the domain name entry, in unexpired status, in the DNS cache 212. If still not found, block 416 resolves the domain name in a recursing mode.

In block 420, the location of the terminal device 128 or other device is generally determined with respect to the Internet 104. For example, a determination might be made that the terminal device 128 is relatively close in network terms to a point of presence in Phoenix, Ariz. The location associated with the requestor is stored in the requestor location database 258 if not done previously in block 424. This embodiment could determine location of the requestor prior to the domain resolution request. For example, a location of a terminal device could be found during a registration process that happens once or periodically.

A time-to-live is determined in block 428, for example, 5 minutes. The time-to-live dictates how long any requesting DNS should store the resulting IP address in a DNS cache 112. Some embodiments of the hybrid DNS 248 choose an IP address(es) to return based upon the location of the requester. In block 432, the response to the requestor is optionally tailored according to location. The IP address(es) is returned to the requestor along with a time-to-live in block 436.

Figure 4B:
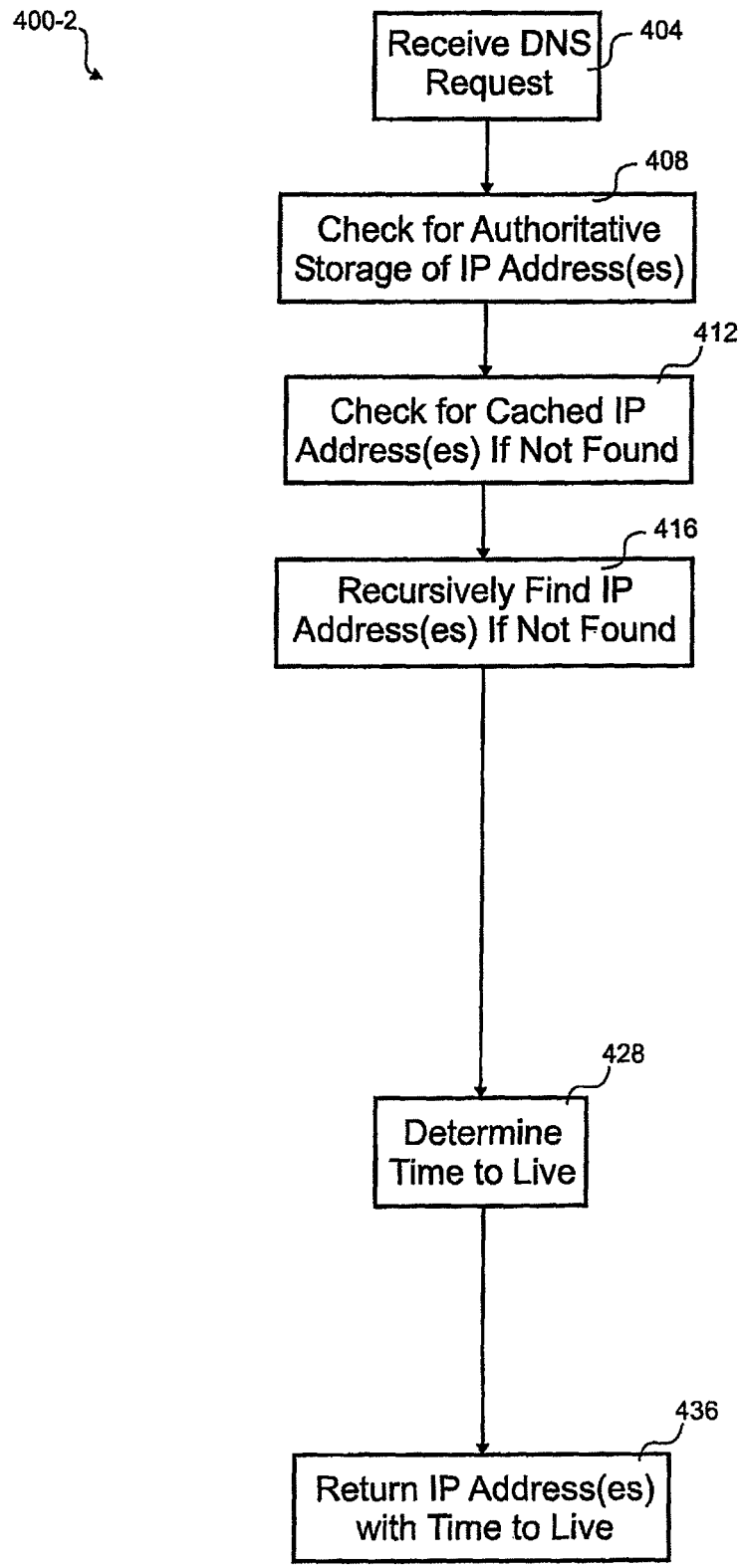

With reference to FIG. 4B, a flow diagram of another embodiment of a process 400-2 for returning an IP address for a provided domain name is shown. This embodiment differs from the embodiment of FIG. 4A by skipping over blocks 420, 424 and 432. This embodiment is not location aware such that a returned IP address(es) are not tailored according to an estimated location of the requestor.

Figure 4C:
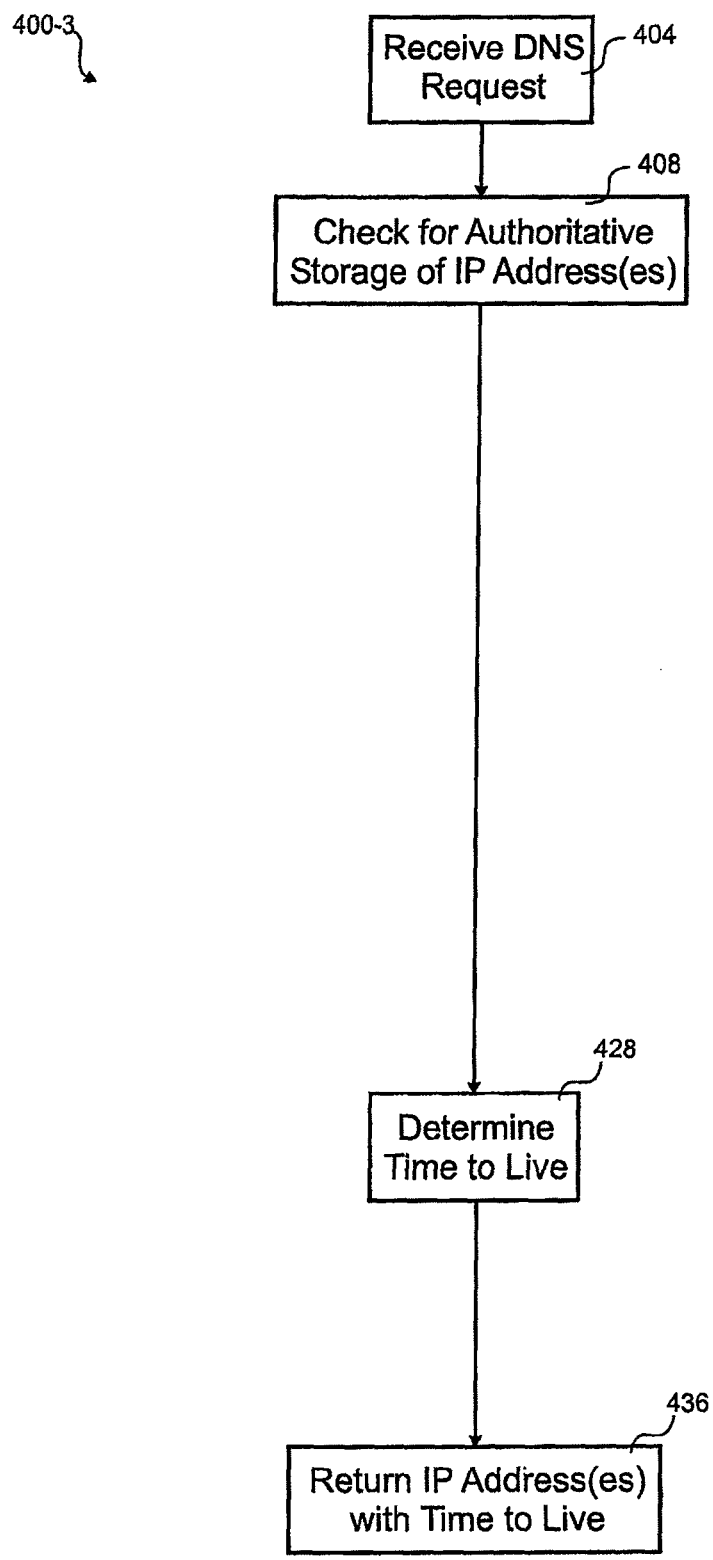

Referring next to FIG. 4C, a flow diagram of another embodiment of a process 400-3 for returning an IP address for a provided domain name is shown. This embodiment uses a direct DNS server 246 that only performs in the authoritative mode and cannot return DNS solutions for content hosted outside the CDN 110. This embodiment differs from that of FIG. 4A in that there are only blocks 404, 408, 428 and 436 performed in succession. IP anycast or a similar technique may optionally be relied upon to deliver a DNS look-up to a nearby POP 205 such that providing the content object from that POP 205 is likely to be efficient.

Other embodiments of the direct DNS server 246 provide an IP address that is redundant to many POPs 205 that could serve the content object such that IP anycast or a similar technique can be used again to optimize which POP 205 would deliver the content object. Some embodiments could only return anycast IP addresses when the content object being served is likely to use connectionless protocols such as UDP.

A number of variations and modifications of the disclosed embodiments can also be used. For example, above embodiments show the hybrid DNS being part of a CDN. In other embodiments, the hybrid DNS could be part of a remote origin server instead. Some embodiments may not even use a CDN, but use the remote origin server instead. By knowing location, the remote origin server can refer the terminal device to any number of IP addresses that might serve the content object from a location closer to the terminal device 128. Some of the above examples refer to receiving a content object by the terminal device, these same principals in resolving a domain can be conversely used with sending a content object from a terminal device.

Some embodiments could modify the DNS request protocol when interacting with a hybrid or Direct DNS server 248, 246. The DNS resolver 208 in the terminal device could include a code or cookie that could be correlated to a requestor location, for example. The code could be a serial number, an actual IP address of the device, a location code, a quickest responding hybrid DNS server, an expected QoS level, or anything else. Instead of a code, a number of ports could be used for the DNS request. By choosing a particular port, the terminal device could indicate a location to the hybrid DNS, for example, or pass other information. The code or cookie could be manually disabled in some embodiments. One embodiment uses the cookie preference specified in the browser to activate or deactivate the modified DNS protocol using the code.

The above embodiments use the direct DNS addresses 250 to find another DNS server to provide the final resolution of a domain. Some embodiments could store the authoritative IP address(es) for specified domains such that further reference to another DNS server can be avoided. In other words, the Internet application and/or DNS resolver can directly find the IP address of the server that will source the content object without referring to the access network or Internet for listed domains.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing or carrying instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Implementation of the techniques described above may be done in various ways. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a software implementation, the techniques, processes and functions described herein may be implemented with modules (e.g., procedures, functions, and so on) that perform the functions described herein. The software codes may be stored in memory units and executed by processors. The memory unit may be implemented within the processor or external to the processor, in which case the memory unit can be communicatively coupled to the processor using various known techniques.

While the principles of the disclosure have been described above in connection with specific apparatuses and methods, it is to be clearly understood that this description is made only by way of example and not as limitation on the scope of the disclosure.

What is claimed is:

1. A domain name service (DNS) resolver for returning Internet protocol (IP) addresses, the DNS resolver comprising:
   a connection with an Internet application or device, wherein the connection receives domain name resolution requests that originate outside of the Internet;
   a direct DNS resolver that identifies IP addresses without referring to the Internet and without using other DNS resolvers;
   an address store, wherein the address store comprises a predetermined list of domain names and corresponding IP addresses that are specified from a point remote to the DNS resolver, wherein the DNS resolver processes the domain name resolutions for the predetermined list of domain names differently than domain name resolutions for other domain names not on the predetermined list of domain names; and
   a cache of domain names different from a predetermined list of domain names,
   wherein at least part of the predetermined list is pushed to a destination upon receiving a resolution request for a domain name in the predetermined list of domain names, the request being of a type other than an authoritative resolution request to be performed by the direct DNS resolver.

2. The DNS resolver for returning IP addresses as recited in claim 1, wherein the domain name resolutions for the predetermined list of domain names are handled by the direct DNS resolver prior to any handling by a recursing DNS resolver that queries one or more DNS servers on the Internet after receiving domain name resolution requests, and wherein other domain name resolutions are not handled by the direct DNS resolver prior to any handling by the recursing DNS resolver.

3. The DNS resolver for returning IP addresses as recited in claim 1, wherein the direct DNS resolver does not process a domain name resolution if a domain name associated with the resolution is not on the predetermined list of domain names.

4. The DNS resolver for returning IP addresses as recited in claim 1, wherein the connection receives the domain name resolution requests on a port not normally used for conventional DNS domain name resolution requests.

5. The DNS resolver for returning IP addresses as recited in claim 1, wherein the predetermined list includes at least some host names for the domain names.

6. The DNS resolver for returning IP addresses as recited in claim 1, wherein the DNS resolver is within an operating system of the Internet application or device.

7. The DNS resolver for returning IP addresses as recited in claim 1, wherein the DNS resolver is located away from user computers.

8. The DNS resolver for returning IP addresses as recited in claim 1, wherein the predetermined list is updated when a domain resolution requests matches a domain on the list, but a host name on the domain resolution request cannot be found on the list.

9. A DNS resolver for returning IP addresses, the DNS resolver comprising:
  a connection with an Internet application or device, wherein the connection receives domain name resolution requests that originate outside of the Internet;
  a direct DNS resolver that identifies IP addresses without referring to the Internet and without using other DNS resolvers;
  an address store, wherein the address store comprises a predetermined list of URL portions that are determined at a point accessible with the Internet, wherein the DNS resolver processes the domain name resolutions for the predetermined list of URL portions differently than domain name resolutions for other URL portions not on the predetermined list of URL portions,
  wherein at least part of the predetermined list is pushed to a destination upon receiving a resolution request for a domain name in the predetermined list of domain names, the request being of a type other than an resolution request to be performed by the direct DNS resolver.

10. The DNS resolver for returning IP addresses as recited in claim 9, wherein the differential processing of the domain name resolutions for the predetermined list of URL portions and the domain name resolutions for the other URL portions not on the predetermined list of URL portions comprises differential initial assignments to the direct DNS resolver or to another resolver.

11. The DNS resolver for returning IP addresses as recited in claim 9, wherein the predetermined list includes IP addresses corresponding to the URL portions.

12. The DNS resolver for returning IP addresses as recited in claim 9, wherein the connection receives the domain name resolution requests on a port not normally used for conventional DNS domain name resolution requests.

13. The DNS resolver for returning IP addresses as recited in claim 9, wherein the URL portions include domain names and/or host names.

14. The DNS resolver for returning IP addresses as recited in claim 9, wherein the address store avoids time-to-live tracking for IP addresses.

15. The DNS resolver for returning IP addresses as recited in claim 9, wherein the predetermined list is updated when a domain resolution requests matches a domain on the list, but a host name on the domain resolution request cannot be found on the list.

16. A method for resolving an IP address for a domain name resolution request, the method comprising steps of:
  receiving, in a non-recursive manner, a list of possible domain name resolution requests and corresponding IP addresses in advance of the possible domain name resolution request being requested;
  storing the list in an authoritative address store;
  receiving the domain name resolution request;
  determining if the domain name resolution request corresponds to any on the list; and
  processing the domain name resolutions request to identify a corresponding IP address, wherein the processing depends on whether the domain name resolution request corresponds to any on the list;
  determining whether the request is of a type other than an authoritative resolution request; and
  upon determining that the domain name resolution request corresponds to one on the list and upon determining whether the request is of a type other than an authoritative resolution request, pushing the list to a destination.

17. The method for resolving the IP address for the domain name resolution request as recited in claim 16, wherein the corresponding IP address is identified locally when the domain name resolution request corresponds to any on the list.

18. The method for resolving the IP address for the domain name resolution request as recited in claim 16, wherein the second-listed receiving step comprises a step of receiving a cookie that comprises information about an Internet application or device originating the domain name resolution request.

19. The method for resolving the IP address for the domain name resolution request as recited in claim 16, wherein the IP address corresponds to at least one DNS server at a content delivery network (CDN).

20. The method for resolving the IP address for the domain name resolution request as recited in claim 16, further comprising steps of:
  determining the list is out of date; and
  requesting an updated list.

* * * * *